United States Patent
Harrison, Jr. et al.

[11] 3,883,753
[45] May 13, 1975

[54] THERMOCOUPLE-FAILURE WARNING CIRCUIT

[75] Inventors: Clarence E. Harrison, Jr., Madison Heights; Siang-Shen Johnson Yun, Dearborn, both of Mich.

[73] Assignee: Ford Motor Company, Dearborn, Mich.

[22] Filed: Jan. 4, 1974

[21] Appl. No.: 430,954

[52] U.S. Cl. ............... 307/117; 317/133.5; 324/51; 340/228 R; 340/248 E
[51] Int. Cl. ............................................ H01h 35/00
[58] Field of Search.......... 317/40 R, 40 A, 41, 132, 317/133.5; 340/228 R, 248 E, 253 B, 255, 256; 324/51; 307/117

[56] References Cited
UNITED STATES PATENTS

| | | | |
|---|---|---|---|
| 3,812,401 | 5/1974 | Radin | 317/133.5 X |
| 3,821,562 | 6/1974 | Davis et al. | 317/133.5 X |

*Primary Examiner*—J. D. Miller
*Assistant Examiner*—Harry E. Moose, Jr.
*Attorney, Agent, or Firm*—Robert W. Brown; Keith L. Zerschling

[57] ABSTRACT

A thermocouple-failure warning circuit for use with a thermocouple-controlled circuit that includes an operational amplifier having first and second inputs. A reference voltage is established at the first amplifier input and the thermocouple is connected between the first input and the second input so that a current can flow through the thermocouple to a point which is at ground potential. An electrically actuable warning device is coupled through a transistor circuit to one lead of the thermocouple. The transistor circuit operates to actuate the warning device if the thermocouple becomes grounded or if it is open-circuited between its leads. In the described embodiment of the invention, a single electrically actuable warning device is used to indicate the grounding or open-circuiting of either of two thermocouples, each of which thermocouples is connected in a separate operational amplifier circuit.

6 Claims, 1 Drawing Figure

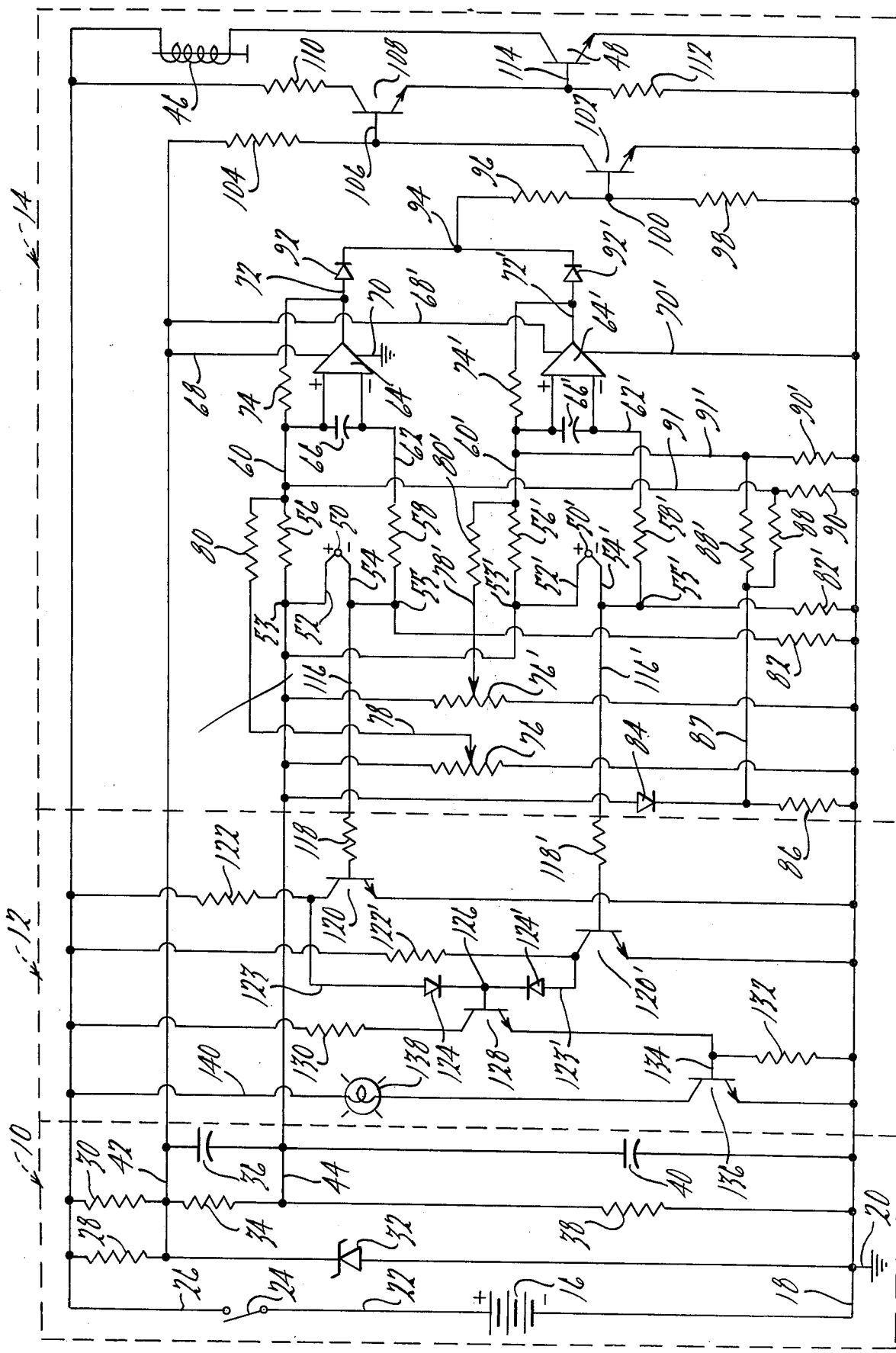

THERMOCOUPLE-FAILURE WARNING CIRCUIT

BACKGROUND OF THE INVENTION

This invention relates to a thermocouple-failure warning circuit designed to provide an indication or warning in the event a thermocouple, normally having one of its junctions at a reference potential, comes into electrical contact with ground potential or in the event the thermocouple becomes open-circuited.

The embodiment of the invention hereinafter described in detail is particularly suitable for use in a thermocoupled-controlled circuit which uses an operational amplifier and other electrical circuitry to control an electrically actuable device. The thermocouple-controlled circuit may be used, for example, to measure the temperature of motor vehicle exhaust gases or of a catalyst located in the stream of motor vehicle exhaust gases. In such applications, the electrically controlled device, which for example may be an air-dump solenoid, is actuated or deactuated, whichever is desired, when the temperature of the exhaust gases or catalyst exceeds some predetermined value, this being done to protect the catalyst against further increases in temperature which might destroy the catalyst.

Where catalysts are used in motor vehicle exhaust systems for the purification of exhaust gases, it is desirable to limit catalyst temperatures to about 1,700°F. In U.S. Pat. application S.N. 347,961 filed Apr. 4, 1973 now U.S. Pat. No. 3,812,401 Bernard G. Radin and entitled "Overtemperature Protection System for Exhaust Gas Conversion Device," there is disclosed a thermocouple circuit including an operational amplifier which produces an output voltage that controls an electrically actuated device for preventing damage to a vehicle exhaust gas purification system and, further, which actuates a warning device in the event the thermocouple indicates an overtemperature condition. Moreover, the circuit of this patent application includes means for providing such an indication or warning when the thermocouple has failed as a result of its being open-circuited. The present invention may be regarded as an improvement over the failure warning circuit disclosed in U.S. Pat. application S.N. 347,961.

SUMMARY OF THE INVENTION

The present invention pertains to a thermocouple-failure warning circuit which provides a warning in the event the thermocouple is open-circuited and also in the event that the thermocouple comes into electrical contact with ground potential or some other fixed electrical potential substantially different than a reference potential established at one of the thermocouple leads. The thermocouple is used in conjunction with a thermocouple-controlled circuit that includes an operational amplifier having an output used to actuate a control device. The thermocouple voltage is applied through input resistors to the inputs of the operational amplifier. One lead of the thermocouple is maintained at a reference potential whereas its other lead is connected to a transistor circuit used to control the actuation of a warning device. Should the thermocouple become grounded or open-circuited, the transistor circuit actuates the warning device to provide an indication that the thermocouple is not functional and, thus, unable to actuate the control device. Where two or more thermocouples are used in conjunction with two or more operational amplifiers for actuating a control device in the event of an overtemperature condition, the respective thermocouples may be coupled through transistor gate circuitry to a single warning device which is actuated in the event that any of the thermocouples become grounded or open-circuited.

The invention may be better understood by reference to the detailed description which follows and to the drawing wherein there is shown a schematic electrical diagram of a thermocouple-failure warning circuit in accordance with the invention.

The thermocouple-controlled circuits described hereinafter are the subject of a concurrently filed patent application in the names of D. R. Darnell and Clarence E. Harrison.

DETAILED DESCRIPTION

With reference now to the drawing, there is shown a schematic diagram of electrical circuitry which includes two thermocouples each of which is used in conjunction with an operational amplifier to control an electrically actuable device. The circuitry of the drawing is divided into three portions by the broken lines indicated by the numerals 10, 12 and 14. The circuitry 10 is used for generation of various supply voltages. The circuit 12 is a transistor gate circuit used to control the actuation of a warning device in the event either of the two thermocouples becomes grounded or open-circuited. The circuit 14 includes the two thermocouples and operational amplifiers, each of the thermocouples being coupled to the circuit 12, and is used to control the deactuation of the controlled device.

With particular reference now to the circuit 10, there is shown a DC source of electrical energy 16, which may be a motor vehicle 12-volt storage battery, having its negative terminal 18 forming a lead connected to ground at 20. The positive terminal of the source 16 is connected by a lead 22 to one pole of a motor vehicle ignition switch 24. The lead 26 from the switch 24 forms an unregulated voltage supply lead.

A pair of parallel-connected resistors 28 and 30 have their upper terminals connected to the unregulated voltage supply lead 26 and have their other terminals connected to a regulated voltage supply lead 42. The supply lead 42 obtains its regulation by virtue of its connection to the cathode of a zener diode 32 the anode of which is connected to the ground lead 18. A voltage divider is formed by the series combination of a resistor 34 and a resistor 38. A lead 44 is connected to the junction formed between the resistors 34 and 38. This lead 44 forms a regulated low-voltage supply lead, preferably, about 5.0 volts, whereas the regulated voltage on the supply lead 42 is higher and, preferably about 9.1 volts. A smoothing and filtering capacitor 36 is connected in parallel with the resistor 34 and a capacitor 40 having a similar function is connected in parallel with the resistor 38.

The unregulated voltage supply lead 26 is connected to a controlled device 46, which may be a solenoid valve that, when de-energized, blocks the flow of auxiliary air into an oxidation catalyst in the exhaust stream of a motor vehicle. The control device 46 is energized when the collector-emitter output circuit of a transistor 48 is conductive, this being the condition in the absence of an excessive temperature sensed by either of the thermocouples.

The circuit 14 includes a first thermocouple 50 which is used in conjunction with a first operational amplifier 64 ultimately to control the operation of the 48. 48 The circuitry associated with the thermocouple 50 and the operational amplifier 64 is described in detail herein. However, the circuit 14 includes a second thermocouple 50' and a second operational amplifier 64' having circuitry that is connected identically to the circuitry associated with the thermocouple 50 and the operational amplifier 64. The thermocouples 50 and 50' will be used to sense different temperatures. In such case, the circuitry associated with the thermocouple 50' may have one or more different component values than the circuitry associated with the thermocouple 50.

The junction of the thermocouple 50 has its positive lead 52 connected to a reference junction 53 at the regulated low-voltage supply lead 44. The negative lead 54 of the thermocouple is connected to a junction 55. An input resistor 58 is connected between the junction 55 and the negative input 62 to the operational amplifier 64. Similarly, an input resistor 56, which in use carries a variable current used for purposes of thermocouple 50 ambient temperature compensation and circuit calibration, is connected between the reference junction 53 and the positive input 60 to the operational amplifier 64. A capacitor 66 is connected across the positive and negative inputs to the amplifier 64 for the purpose of filtering and smoothing the input signal. The negative supply lead to the amplifier 64 is connected to ground at 70 and its positive supply voltage is obtained via a lead 68 connected to the regulated higher-voltage supply lead 42.

The output 72 of the amplifier 64 has a feedback resistor 74 connected between it and the positive input terminal 60 to the amplifier. The function of the feedback resistor 74 is to provide positive feedback to the positive terminal of the amplifier 64 such that, once a millivoltage is applied across the amplifier input terminals to cause its output 72 to increase to its maximum value, a portion of this output voltage is fed back to the input to add to the initial input voltage. This establishes a hysteresis in the amplifier circuit which permits the amplifier to go to a maximum voltage level when the thermocouple 50 senses a predetermined temperature, but which prevents the amplifier output voltage from going to a low-level unless the thermocouple senses a predetermined temperature substantially less than that which initially caused the amplifier output to increase to its maximum voltage level.

The right-hand terminal of the input resistor 56 is connected through a resistor 80 to the movable arm 78 of a potentiometer 76. The potentiometer resistance is connected between the regulated low-voltage supply lead 44 and the ground lead 18.

A temperature-compensating diode 84 has its anode connected to the regulated low-voltage supply lead 44 and has its cathode connected through a resistor 86 to the ground lead 18. Thus, diode 84 and resistor 86 are connected in series between supply lead 44 and ground lead 18. A lead 87 connects the junction formed between the diode 84 and the resistor 86 to one terminal of a resistor 88. The other terminal of the resistor 88 is connected through a resistor 90 to the ground lead 18. The junction formed between the resistor 88 and the resistor 90 is connected by a lead 91 to the amplfier-input junction 60 formed between the righthand terminal of the resistor 56 and the positive input to the amplifier 64.

In the operation of the thermocouple 50 and the operational amplifier 64, only a differential voltage of a few millivolts applied across the amplifier inputs 60 and 62, input 60 being positive with respect to input 62, is sufficient to cause the amplifier output 72 to reach a maximum voltage level. The output voltage of the thermocouple 50 at a particular temperature depends upon the materials comprising the thermocouple. For example, the thermocouple 50 may produce a voltage signal of 36 millivolts at a temperature at which it is desired to have the amplifier output 72 reach its maximum voltage level. The junction 53 is a reference voltage junction and is at the highest voltage point in the thermocouple-controlled amplifier input circuitry. This reference junction 53 voltage, for example, may be a regulated 5.0 volts as previously described, and this voltage, minus the millivoltage signal developed across the thermocouple 50, is applied through the thermocouple to the junction 55.

Since no appreciable current flows through the resistor 58, the negative input 62 to the amplifier 64 is at the same potential as is the junction 55. However, a variable current flows from the reference junction 53, through the resistor 56 and into the amplifier input 60. The input 60 to the amplifier 64 is at a potential less than that at the reference junction 53 due to the current flow through the resistor 56. The magnitude of this potential difference is directly proportional to the current in the resistor 56 and acts in opposition to the voltage signal developed by the thermocouple 50. If the voltage drop across the resistor 56 were, for example, 36 millivolts, then the input terminal 60 to the amplfier 64 would start to become positive with respect to the amplifier input 62 when the voltage of the thermocouple 50 began to exceed 36 millivolts. This would cause the output 72 of the amplifier to switch from a low voltage to its maximum voltage.

The voltage drop across the input resistor 56 is determined by the current through this resistor as previously stated. The current through the resistor 56 divides at the junction 60. A portion of this current flows through the resistor 80, through the arm 78 of the potentiometer 76, and through the lower portion of the potentiometer resistance to the ground lead 18; of course, the magnitude of this current portion is determined by the point at which the arm contacts the potentiometer resistance and variation of this point is used to vary the potential difference across the resistor 56, thereby, to permit calibration of the temperature response at the output of the amplifier circuit.

In addition to the current in the potentiometer circuit, a second portion of the current flowing through the resistor 56 flows through the lead 91 to the junction formed between the resistors 88 and 90. At this junction, this second current portion again divides, a portion of it flowing through the resistor 88 and through the resistor 86 to the ground lead 18. The presence of the resistor 90 in the circuit makes a contribution to the total current in resistor 56. The amount of current which flows through the resistor 88 and the resistor 86 to the ground lead 18 is variable and determined by the potential existing at the junction formed between the temperature compensating diode 84 and the resistor 86. The diode 84 has a negative temperature coefficient such that the voltage drop or potential difference across it decreases as ambient temperature increases. Thus, as ambient temperature increases, the voltage at the junction between the diode 84 and the resistor 86 increases. This provides a greater impedance to current flowing through the input and calibration resistor 56, thereby, to decrease the current and the potential difference across resistor 56 as ambient temperature increases. As a result, the circuit is compensated for changes in ambient temperature since the thermocouple output voltage also decreases as ambient temperature increases.

When the signal voltage from the thermocouple 50 is sufficient to overcome the voltage drop across the input resistor 56, the output 72 of the operational amplifier 64 switches to its maximum voltage level. This output voltage is applied through a blocking diode 92 to a junction 94. The amplifier output voltage, less the drop across the blocking diode 92, occurs at the junction 94 and this voltage is divided by a pair of series-connected resistors 96 and 98. The junction 100 formed between the resistors 96 and 98 is connected to the base of a transistor 102. When either the output of the amplifier 64 or of the amplifier 64' is at its maximum voltage level, the transistor 102 is rendered conductive in its output circuit.

The collector of the transistor 102 is connected through a current limiting resistor 104 to the regulated higher-voltage supply lead 42. The juntion between the collector of the transistor 102 and the resistor 104 is connected by a lead 106 to the base of a transistor 108. When the transistor 102 is conductive in its output circuit, the lead 106 falls to nearly ground potential and the transistor 108 is rendered nonconductive in its output circuit. The collector of the transistor 108 is connected through a resistor 110 to the unregulated voltage supply lead 26 and its emitter is connected through a resistor 112 to the ground lead 18. The emitter of the transistor 108 also is connected by a lead 114 to the base of the transistor 48. When the transistor 108 becomes nonconductive, corresponding to the occurrence of the maximum voltage level at the output 72 of the amplifier 64 or of a maximum voltage level at the output 72' of the amplifier 64', the lead 114 is placed at essentially ground potential to render the output circuit of the transistor 48 nonconductive. This de-energizes the control device 46.

From the above, it is apparent that the thermocouples 50 and 50' operate in the circuitry 14 to control the actuation of a control device 46. However, it is the thermocouple-failure warning circuit 12 that is of primary concern herein.

The circuitry 12 is a gate circuit which is used to cause the energization of a warning device 138, which may be a warning light or buzzer or other electrically actuated device, when either of the thermocouples 50 or 50' becomes short-circuited to ground potential or open-circuited.

The negative thermocouple lead 54 is connected by a lead 116 and a current-limiting resistor 118 to the base of a transistor 120. The emitter of the transistor 120 is connected to the ground lead 18 and its collector is connected through a current-limiting resistor 122 to the unregulated voltage supply lead 26. The collector of the transistor 120 is also connected by a lead 123 to the anode of a blocking diode 124. Similarly, the negative lead of the thermocouple 50' is connected via a lead 116' and a current-limiting resistor 118' to the base of a transistor 120' the emitter of which is connected to ground and the collector of which is connected through a resistor 122' to the unregulated voltage supply lead 26. The collector of the transistor 120' is connected by a lead 123' to a blocking diode 124'. The cathodes of the blocking diodes 124 and 124' are connected together at a junction 126. The junction 126 is connected to the base or control electrode of a transistor 128 the collector of which is connected through a current-limiting resistor 130 to the unregulated voltage supply lead 26. The emitter of the transistor 128 is connected through a resistor 132 to the ground lead 18 and also is connected to the base or control electrode 134 of a transistor 136. The collector-emitter output circuit of the transistor 136 is connected in series with the warning device 138. The emitter of the transistor 136 is connected to the ground lead 18 and the lead 140 from the warning device 138 is connected to the unregulated voltage supply lead 26.

In the operation of the warning circuitry 12, the negative lead 54 of the thermocouple 50 is at the reference junction 53 voltage, less the thermocouple signal millivoltage, under normal circumstances. This voltage is applied through the resistor 118 to the base of the transistor 120 to render it conductive in its output circuit. This places the collector of the transistor 120 at nearly ground potential. Since the collector of the transistor 120 is connected to the base of the transistor 128, the base-emitter junction of the transistor 128 does not have sufficient forward-bias to render it conductive when the transistor 120 is conductive. With the transistor 128 nonconductive, the control electrode 134 of the transistor 136 is connected, through the resistor 132, to ground potential; there is no base-emitter drive for the transistor 136 and it is nonconductive in its output circuit.

The transistor 120' coupled to the negative lead 54' of the thermocouple 50' also is conductive as long as the lead 54' is maintained at a voltage level near that of the voltage reference junction 53'. This also prevents conduction of the transistor 128 and renders the transistor 136 nonconductive in its output circuit.

If either of the thermocouples 50 or 50' becomes open-circuited or comes into contact with ground potential, they will not perform their function in controlling the actuation of the device 46. The warning circuitry 12 provides an indication of such thermocouple failure.

If the thermocouple 50 becomes open-circuited, the voltage at its negative lead 54 falls to ground or essentially ground potential since its connection to the reference junction 53 then would be through the high input impedance of the operational amplifier 64 and the high DC impedance provided by the capacitor 66 connected across the amplifier input terminals. Thus, with the negative thermocouple lead 54 at or near ground potential, the transistor 120 is rendered nonconductive in its output circuit. This places the lead 123 at the unregulated voltage of the supply lead 26, and this voltage, less the voltage drop across the blocking diode 124, is applied to the base of the transistor 128 to render it conductive in its output circuit. (It should be noted that if the transistor 120' remains conductive, the blocking diode 124' prevents flow of current from the junction 126 into the conductive output circuit of the transistor 120'). The conduction of the transistor 128 places the base or control electrode 134 of the transistor 136 at a potential sufficient to forward-bias the base-emitter junction of this transistor. This renders the transistor 136 conductive in its collector-emitter output circuit to energize the warning device 138. A similar operation occurs if the thermocouple 50 comes into contact with ground potential.

Energization of the warning device 138 provides an indication of the failure of one of the thermocouples 50 or 50'. Of course, should the thermocouple 50' become open-circuited or come into contact with ground potential, the transistor 120' is rendered nonconductive, the transistor 128 is rendered conductive, and the transistor 136 also is rendered conductive in its output circuit to energize the warning device 138. Thus, the grounding or open-circuiting of either or both of the thermocouples 50 or 50' results in the energization of the warning device 138.

What is claimed is:

1. A thermocouple-failure warning circuit for use with a thermocouple-controlled operational amplifier, said warning circuit comprising, in combination, first and second voltage supply leads for connection to a source of DC electrical potential; a thermocouple having first and second leads coupled to input terminals of said operational amplifier, said thermocouple first lead being coupled to said first voltage supply lead; a resistor, said thermocouple second lead being coupled through said resistor to said second voltage supply lead; a warning device; a transistor having an output circuit and a control electrode, the output circuit of said transistor being connected with said warning device to control the actuation of said warning device; first circuit means for coupling said warning device and transistor output circuit across a source of electrical potential; and second circuit means for changing the state of conduction of the output circuit of said transistor if either said thermocouple is open-circuited between its first and second leads or if said thermocouple is short-circuited to the electrical potential of said second voltage supply lead, said circuit means being connected to said transistor control electrode and having an input electrical lead connected to said thermocouple second lead, whereby, said warning device may be actuated by a change in the state of conduction of aid transistor output circuit if said thermocouple is open-circuited or short circuited.

2. A thermocouple-failure warning circuit in accordance with claim 1, wherein said second circuit means comprises a second transistor having an output circuit and a control electrode, said input electrical lead being coupled to said second transistor control electrode, said output circuit of said second transistor being coupled to said control electrode of said first-mentioned transistor, said second transistor output circuit being conductive in its output circuit in the absence of said thermocouple being open-circuited between said thermocouple first and second leads and in the absence of said thermocouple being short-circuited to the electrical potential of said second voltage supply lead.

3. A thermocouple-failure warning circuit in accordance with claim 2, wherein said second circuit means further comprises a third transistor having an output circuit coupled to said control electrode of said first-mentioned transistor, said third transistor having a control electrode coupled to said output circuit of said second transitor, the output circuits of said first-mentioned transistor and said third transistor being nonconductive when the output circuit of said second transistor is conductive, and the output circuits of said first-mentioned transistor and third transistor being conductive when the output circuit of said second transistor is conductive.

4. A thermocouple-failure warning circuit for use with a first thermocouple-controlled operational amplifier and a second thermocouple-controlled operational amplifier, said warning circuit comprising, in combination, first and second voltage supply leads for connection to a source of DC electrical potential; a first thermocouple having first and second leads coupled to input terminals of said first operational amplifier, said first terminals of said first and second thermocouples being coupled to said first voltage supply lead; a first resistor, said second lead of said first thermocouple being coupled through said first resistor to said second voltage supply lead; a second resistor, said second lead of said second thermocouple being coupled through said second resistor to said second voltage supply lead; a warning device; a transistor having an output circuit connected to said warning device to control actuation of said warning device, said transistor having a control electrode; circuit means for coupling said warning device and transistor output circuit across a source of electrical potential; and gate circuits means for changing the state of conduction of the output circuit of said transistor if either of said first and second thermocouples is either open-circuited or short-circuited to the electrical potential of said second voltage supply lead, said gate circuit means having a first input electrical lead connected to said second lead of said first thermocouple and having a second input electrical lead connected to said second lead of said second thermocouple; whereby, said warning device may be actuated by a change in the state of conduction of said transistor output circuit if either of said first and second thermocouples is either open-circuited or short-circuited.

5. A thermocouple-failure warning circuit in accordance with claim 4 wherein said gate circuit means comprises a plurality of interconnected solid-state switching devices coupled between said control electrode of said transistor and said first and second input electrical leads, said plurality of solid-state switching devices collectively causing an electrical potential to be applied to said control electrode of said transistor to maintain the output circuit of said transistor in a conductive state when either of said thermocouple is open-circuited or short-circuited to said second voltage supply lead.

6. A thermocouple-failure warning circuit in accordance with claim 5 wherein said plurality of solid-state switching devices comprises: a third resistor; a second transistor having its base coupled through said third resistor to said first input electrical lead and having its emitter connected to said second voltage supply lead; a fourth resistor; a third transistor having its base coupled through said fourth resistor to said second input electrical lead and having its emitter connected to said second voltage supply lead; a fourth transistor having its emitter connected to said control electrode of said first-mentioned transistor; circuit means for coupling the collectors of said second, third and fourth transistors to a source of electrical potential; a first diode having its anode connected to said collector of said second transistor and having its cathode connected to the base of said fourth transistor; and a second diode having its anode connected to the collector of said third transistor and having its cathode connected to the base of said fourth transistor.

* * * * *